July 3, 1934. J. F. KELLY 1,965,242

MOLD

Original Filed Nov. 24, 1931

INVENTOR.
JOHN F. KELLY.
BY Hugo A. Maerlender
ATTORNEY.

Patented July 3, 1934

1,965,242

UNITED STATES PATENT OFFICE 1,965,242

MOLD

John F. Kelly, Elkins, W. Va.

Application November 24, 1931, Serial No. 576,984
Renewed January 19, 1934

7 Claims. (Cl. 49—65)

This invention relates to molds and in particular to molds such as are employed in the glass industry for manufacturing glassware and packer's ware. More particularly the invention comprises a mold suitable for making tumblers or similar glassware in a wide variety of shapes and forms.

Such molds have generally consisted of gray iron castings of appreciable weight and the inside surface forming cavity or matrix has been chilled to densen the grain. The difficulty of machining this surface as well as the deformities resulting from dirt, blow holes and the like which result in the rejection of the castings makes this process extremely expensive. Further, the cost of special alloys prohibits the use of solid molds cast from a better grade of metal than gray cast iron and, accordingly, they are more susceptible to destruction because of wear and corrosion. In some instances a slight wearing of the mold surface renders the entire mold useless. In general, the object of this invention embraces the avoidance of the foregoing difficulties. The substitution of a sleeve mold for the solid casting now employed made in accordance with the incidental objects to be achieved eliminates such difficulties. The inner surface or matrix may be efficiently and economically formed of a metal having the proper wearing qualities. Being of relatively small size and weight it may be discarded at much less expense than if the entire mold were scrapped.

The formation of such a separate inner surface as part of the entire mold itself presents a further problem which it is one of the objects of this invention to remedy. One of the requirements of a mold is to be able to radiate or conduct heat away from the inner surfaces of the matrix rapidly. Ordinarily the presence of any insulating material such as dirt, scale, air, grease or the like produces, I have found, a heat barrier which causes the heat to be retained by the inner surface and to build up, soon rendering the entire mold inoperative. Further and incidental objects will appear more fully in connection with the means to which they relate.

Since the invention may be easily illustrated reference may be had to the annexed drawing in which.

Figure 3:
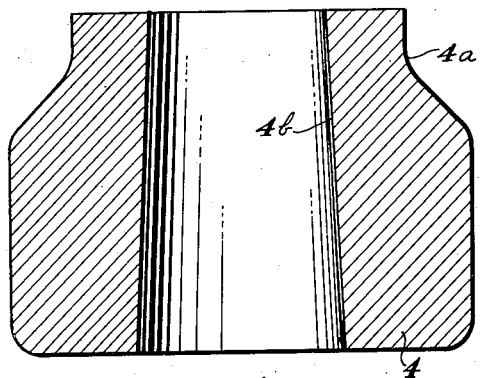
Figure 3 illustrates in section one of the components of such an improved mold, the view indicating the outer sleeve dismembered.
Figure 2:
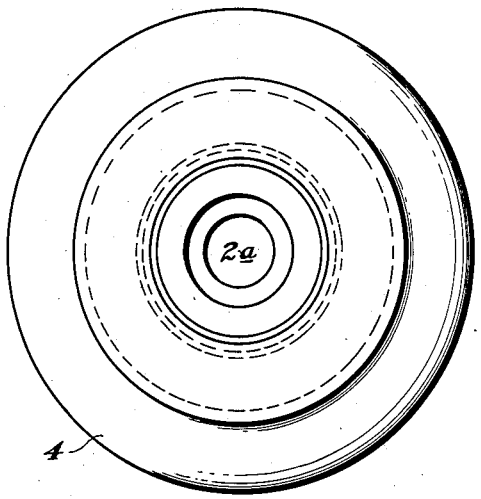
Figure 2 is a top view as taken on the line 2—2 of Figure 1.

Briefly the invention requires the component parts 2 presenting and forming the central cavity or matrix 2a, and an outer section 4 in high and efficient thermal contact with the central cavity 2a. Various modifications of this structure are possible and include the use of a third part such as the liner 3 adapted to contact the outer surface of the part 2 and the inner surface of the section 4. Such means are effective in producing an efficient thermal conductivity and radiation to the outer section 4. These parts when assembled present a substantially solid structure, although capable of being readily taken apart for replacement if desired.

The annular bowl 4 is preferably formed as in the manner shown in Figure 3 and for convenience may be characterized by the narrowed section 4a at the top. It forms and defines preferably also an inner surface 4b which is preferably of truncated conical form. This section comprises the bulk of the mold and may be made of cast iron. As employed in the assembly it is subjected to no wear incidental to the operation of the mold and may last indefinitely.

The part 2 defines the inner surface or matrix 2a which during the use of the mold forms the casting of glass or the like. The surface 2a must be hard and resistant to wear and corrosion. Further, it must be readily machined and at the same time be resistant to oxide and scale formations and to the development of fire cracks. To this end a special alloy is highly desirable and preferably employed since the greater the resistance of this surface to the foregoing effects which soon render the present molds inoperative the longer the member 2 may be used without replacement. To make an entire mold comprising a single casting of such an alloy is prohibitive but the use of thinner sections such as the member 2 is highly desirable and made possible by the expedient presently to be described. The hollow matrix 2a is shown of truncated conical form for the construction of tumblers but obviously could assume other forms adaptable to different types of ware. Flat, convex, concave and other shaped mold surfaces can be similarly formed by the matrix surface 2a. The working sections of lens, bottle and similar molds are similarly made by casting them of suitable special alloys and efficiently securing them thermally to a base or background preferably of gray cast iron as previously described.

The inner section 4 is constantly subjected to high temperatures and even when made of heat resistant material must be given an opportunity to dispose of its heat. Otherwise the finished mold cavity would soon become inoperative due to the building up of the temperature. Merely inserting a shell such as the part 2 in an outer mold section even if a tight fit is obtained is ineffectual since the joint under ordinary circumstances constitutes an effective insulator which retards the conduction of heat to the outer member 4.

Figure 4:
Figure 4 is likewise a vertical section of a central portion of the mold likewise dismembered.
Figure 1:
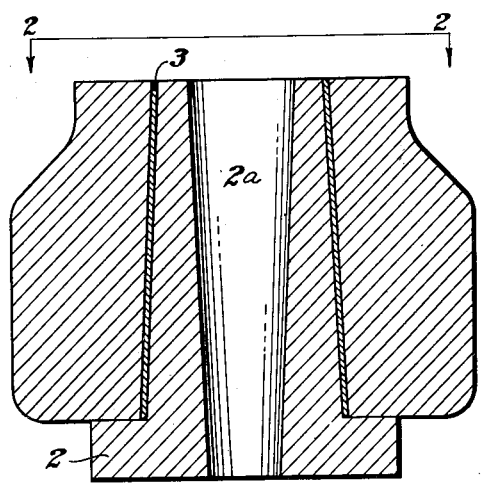
Figure 1 is a vertical section of a sleeve mold embodying my invention.
Figure 5:
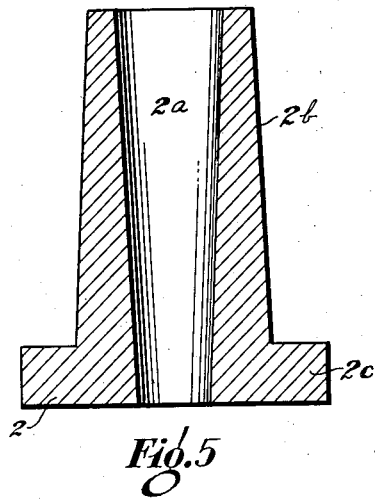
Figure 5 shows in vertical section the inner mold portion, which with the parts shown in Figures 3 and 4 completes the structure assembled and depicted in Figure 1.

To the end that the foregoing difficulty may be obviated I preferably provide a section 3 which is designed to fit the outer surface 2b of the matrix and the inner surface 4b of the outer mold form. When made as shown in Figure 4 it constitutes a shell of high thermal conductivity and is made of copper, aluminum, silver or the like. Thermal contact is preferably obtained by casting a liner of aluminum between the inner and outer sections. Alternative expedients for obtaining the desired thermal contact include pressing a liner of sheet copper, aluminum, or like metal between the insert and sleeve at a pressure of 15 tons or more, coating the inner and outer sections 4b and 2b respectively with powdered metal having a high conductivity and pressing the same together with similar high pressure and coating these surfaces with cements also of high thermal conductivity and pressing these sections together. The sections of the mold can be shrunk together by heating slightly undersize liners or sleeves until the inner members will slide within and then allowing the liner or sleeve to shrink and securely grip the insert. Clearly, the members can be clamped, bolted or studded together if desired.

A further expedient to obviate the use of a liner or its equivalent may be employed. In this case thermal contact between the insert 2 and sleeve 4 is accomplished by producing a ground joint. Such a joint is formed by moving or grinding the surfaces together with a suitable abrasive such as emery or carborundum. After a ground fit has been obtained the abrasive is removed and the sections are held together mechanically as by bolts or clamps.

Likewise, preparatory to all of the other foregoing methods it is first advisable and practically necessary to remove any deposits of scale, oxide or grease from the inside surface of the sleeve and the outside surface of the insert. Grinding, machining, electroplating or an equivalent method is suitable for this purpose. The thickness of the liner formed by any of these methods may be varied to suit the heat absorbing, conducting and diffusing properties of the liner or joint and at the same time to increase the heat capacity of the entire mold.

The important advantages resulting from the use of this mold are available both to the foundryman and the glass manufacturer. The percentage of loss to the foundryman due to physical defects in the casting which cause their rejection by the glass manufacturer is practically eliminated or reduced to a minimum by the use of this mold. The glass manufacturer on the other hand obtains superior performance, longer life of the castings in use, increased production due to the elimination of shutdowns for repairs, better and cheaper glassware and in general a considerable lowering of manufacturing costs.

Various modifications in design and the substitution of mechanical equivalents have been suggested herein and others will readily suggest themselves to those skilled in the arts to which this invention relates and are included within the scope of the appended claims.

What I claim and desire to secure by Letters Patent is:

1. A mold comprising a matrix, an outer sleeve and intervening conduction means of high thermal conductivity all assembled in efficient mutual heat exchange relationship.

2. A mold comprising a matrix formed of heat and corrosion resistant metal, an outer sleeve of cast iron and an intervening liner of metal having a high thermal conductivity all assembled in efficient heat exchange relationship.

3. A sleeve mold comprising a matrix formed by a shell of heat and corrosion resistant metal, an outer casing of cast iron and an intervening insert of metal having a high thermal conductivity all assembled in efficient heat exchange relationship.

4. A mold comprising a matrix formed of heat and corrosion resistant metal, an outer sleeve of cast iron and an intervening liner of metal having a high thermal conductivity, and means securing said matrix, sleeve and liner in efficient heat exchange relationship.

5. A mold comprising in combination with an outer casing having a central recess, an insert containing a mold matrix having a surface opposed to said recess free of foreign matter, an intervening filler having a high heat conductivity occupying the space between said casing and insert and means securing said casing, insert and filler under pressure.

6. A mold comprising a matrix, an outer sleeve and intervening filling means of high thermal conductivity all assembled in efficient mutual heat exchange relationship.

7. A mold comprising a matrix having an outer surface free of foreign matter, an outer sleeve having an inner surface free of foreign matter, and intervening conduction means of high thermal conductivity all assembled in efficient mutual heat exchange relationship.

JOHN F. KELLY.